Feb. 9, 1937.   F. G. BEETEM   2,070,541
STORAGE BATTERY CHARGE CONTROL
Filed Aug. 9, 1934

INVENTOR
Frank G. Beetem
BY
Augustus B. Stoughton
ATTORNEY.

WITNESS:
Robt M Mitchel

Patented Feb. 9, 1937

2,070,541

UNITED STATES PATENT OFFICE 2,070,541

STORAGE BATTERY CHARGE CONTROL

Frank G. Beetem, Philadelphia, Pa., assignor to The Electric Storage Battery Company, Philadelphia, Pa., a corporation of New Jersey Application August 9, 1934, Serial No. 739,075

5 Claims. (Cl. 171—314)

The invention relates to apparatus designed to charge a battery intermittently through a rectifier of the type in which a hot filament cathode sealed in a tube containing mercury vapor or other gas is employed for supplying the charging current. It has been observed that where a rectifier of this type is started up from the cold condition at frequent intervals, its life as measured by the number of ampere hours transmitted is considerably reduced as compared with its life when carrying current continuously. If however the cathode is brought up to its normal operating temperature before current is transmitted through the rectifier, this shortening of the life does not take place. In the charging system of my invention, I provide automatic means for applying heating current to the cathode filament of such a rectifier for a sufficient period of time prior to connecting the rectifier to its charging circuit to permit the cathode to attain its normal operating temperature before the charging current is permitted to flow.

Figure 2:
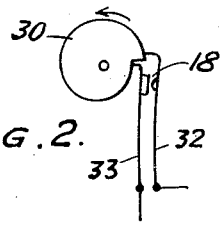
Figure 1:
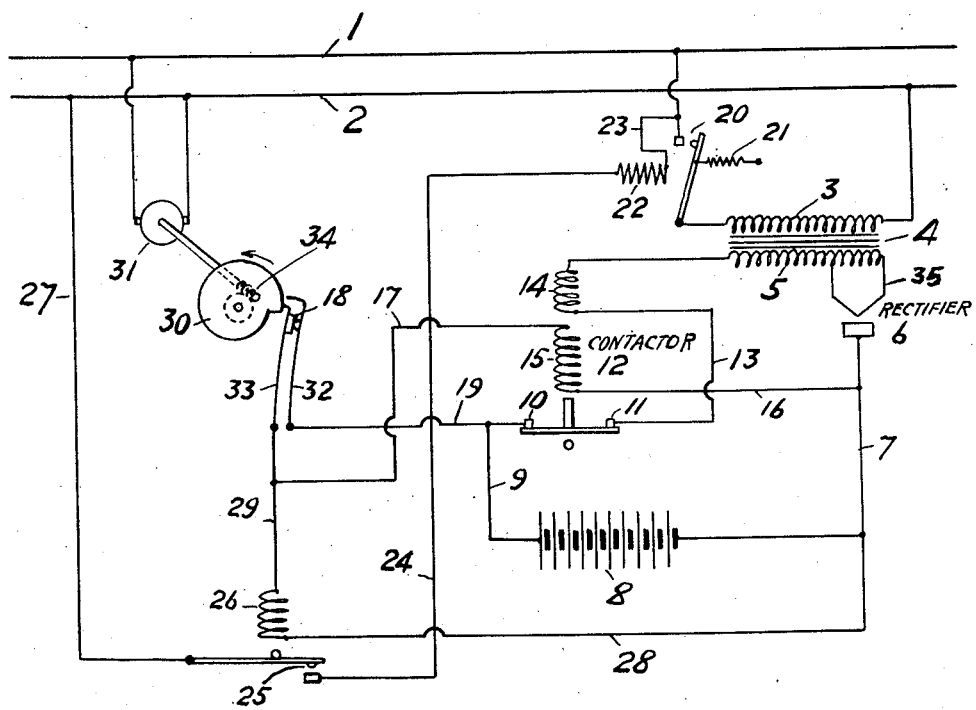

In the drawing Figure 1 shows diagrammatically a charging system and apparatus embodying features of the invention and, Figure 2 shows the position of the circuit interrupter during the brief period of interruption.

In Figure 1, numerals 1, 2 indicate an A. C. supply circuit to which is connected the primary winding 3 of the transformer 4. The secondary winding 5 of this transformer is connected through the rectifier 6 via conductor 7 to the negative terminal of the battery 8, the positive terminal being connected via conductor 9 and contacts 10 and 11 of contactor 12 via conductor 13 to the other terminal of the secondary winding 5. In circuit with conductor 13 is the series coil 14 of contactor 12. One terminal of the shunt winding 15 of contactor 12 is connected via conductors 16 and 7 to one terminal of the battery 8 while the other terminal of winding 15 is connected via conductor 17 and contacts at 18 and conductors 19 and 9 to the other terminal of the battery.

Current for heating the filament 35 of rectifier 6 is obtained from a few end turns of the secondary winding 5 of transformer 4. The rectifier is of the thermionic gas filled type.

Between one terminal of the primary winding 3 of transformer 4 and conductor 1 is inserted the contacts of an electro-magnetic switch 20 normally held in the open position by spring 21 but drawn into the closed position against the tension of spring 21 by the coil 22 connected across the circuit 1, 2 by conductors 23, 24, contacts 25 of relay 26 and the conductor 27. The exciting coil of relay 26 is connected across the battery by conductor 28 on one side and conductor 29, contacts 18 and conductors 19 and 9 on the other side.

The opening and closing of contacts at 18 are controlled by a revolving cam 30 driven by an A. C. motor 31 through a worm gear 34, the motor 31 being connected to the circuit 1, 2. The contact at 18 is normally held closed by the pressure of the resilient member 32 so long as the resilient member 33 bears at its upper end against the revolving cam 30 as shown in Figure 1. When however the cam wheel 30 has revolved for a short distance in the direction of the arrow to the position shown in Figure 2, the resilient member 33 will spring to the left, opening the contacts at 18 because of the fact that the resilient member 32 is still bearing at its upper end on the surface of the cam 30 having the maximum radius. When the cam wheel 30 has traveled still further in the direction of the arrow beyond the position shown in Figure 2, the resilient member 32 will be released and the contacts at 18 will again be closed. Thus during each revolution of the cam wheel 30 the contact at 18 is opened for a short period of time and then reclosed. For example, the cam wheel may make one revolution per hour and the contact at 18 be opened for a period of one minute each hour, but the most suitable values for these time intervals will vary with the capacity of the battery and the charging rate and other operating conditions.

The operation of the apparatus described above is as follows:

Assuming that the voltage of the battery has risen to a value sufficient to cause the voltage relay 26 to open the contacts at 25, thus interrupting the current in coil 22 of relay 20, thereby opening the contacts of this relay, transformer 4 will be disconnected from the A. C. circuit 1, 2 and no charging current will be delivered to the battery, there being no voltage developed in the secondary winding 5 of transformer 4. No current will be flowing through the filament 35 of rectifier 6 and this filament will therefore be cold. Assuming that the cam wheel 30 has reached a position shown in Figure 1, so that current is still maintained in the coil 15 of contactor 12, derived from the battery 8 via conductors 9 and 19, contacts 18, conductor 17, through coil 15 and thence via conductors 16 and 7 to the opposite terminal of the battery, the contacts 10 and 11 of contactor 12 will therefore be closed but by reason of the fact that no voltage is being developed in the secondary winding 5 there will be no charging current passing into the battery as above stated.

When the cam wheel 30 has traveled a short distance further in the direction of the arrow, the contact at 18 will be opened, thus simultaneously opening the circuit of coil 26 and coil 15. This will permit the contacts at 25 to close, allowing exciting current to flow through coil 22 of relay 20 and closing the contact of this relay and connecting the primary 3 of transformer 4 to the circuit 1, 2. This will develop voltage in the secondary winding 5 of transformer 4 and supply heating current to the filament 35 of rectifier 6. However, because of the fact that there was no charging current flowing into the battery through coil 14 and the circuit of coil 15 has been opened by opening the contacts at 18, the contacts 10 and 11 of contactor 12 will remain open and no charging current can flow into the battery under these conditions, thus permitting a short interval of time for the filament 35 to become heated to its normal operating temperature.

When the cam wheel 30 has traveled a little further from the position shown in Figure 2, releasing the resilient member 32 and reclosing the contacts at 18, the exciting coil 15 of contactor 12 will be energized and the contacts at 10 and 11 will be closed, permitting charging current to be transmitted to the battery through rectifier 6. This condition will continue until the voltage of the battery again rises to a point sufficient to cause the relay 26 to open the contacts at 25 and interrupt the charging current.

If by the time the cam wheel 30 has made another complete revolution to the position shown in Figure 2, the battery voltage has not risen to a value sufficient to operate the voltage relay 26 so that the circuit of coil 22 of contactor 20 is still closed and the primary winding 3 of transformer 4 is still connected to the circuit 1, 2 and charging current is still flowing into the battery, series coil 14 of contactor 12 will be carrying current sufficient to keep the contacts 10 and 11 of contactor 12 closed, notwithstanding the fact that by opening the contact at 18, the circuit of coil 15 has been interrupted. Under these conditions, the opening of the contact at 18 will have no effect on the charging current delivered to the battery.

In order to avoid frequent interruption of the current in the filament of the rectifier in intermittent service, it has been proposed to keep the primary of the transformer always connected to the A. C. line and only open the secondary circuit when the charging current is to be interrupted, thus keeping the heating current passing continuously through the filament of the rectifier. This however is objectionable from the fact that the losses in the transformer and the energy required for heating the filament when not in use may add appreciably to the cost of operation. Furthermore, when the load on the rectifier and transformer due to the charging current is interrupted, the voltage developed in the secondary winding of the transformer rises appreciably causing an excessive flow of current through the filament of the rectifier tube which will shorten its life. These difficulties are obviated in the system herein described in which the circuit of the primary of the transformer is opened whenever the charging current to the battery is to be interrupted.

I claim:

1. In combination, an A. C. supply circuit, a transformer provided with primary and secondary windings whereof the primary is normally connected to the supply circuit, a storage battery, a charging circuit for the battery connected to the secondary winding of the transformer, a thermionic rectifier interposed in said charging circuit, said rectifier having a cathode filament connected to the secondary winding to receive heating current therefrom, means responsive to the battery voltage for interrupting the primary circuit, contacts in the charging circuit for opening and closing the same, means adapted to close said contacts, and means for periodically and simultaneously nullifying and then restoring said interrupting means and said closing means.

2. In combination, an A. C. circuit, a transformer provided with primary and secondary windings whereof the primary is normally connected to the supply circuit, a storage battery, a charging circuit for the battery connected to the secondary winding of the transformer, a thermionic rectifier of the gas filled type interposed in said charging circuit, said rectifier having a cathode filament connected to the secondary winding to receive heating current therefrom, a primary relay having its contacts in the circuit of the primary winding and having an exciting coil adapted when excited to hold said contacts closed, a voltage relay having an exciting coil connected across the battery and adapted to open the circuit of the primary relay exciting coil at a predetermined battery voltage, a contactor whose contacts are interposed in the battery charging circuit, said contactor provided with two exciting coils whereof one is connected in said charging circuit and is adapted to hold said contacts closed when charging current is flowing, and whereof the other is adapted when excited, to close said contacts, a circuit for supplying exciting current to said closing coil, and means for periodically and simultaneously opening and reclosing the circuits of the exciting coil of the voltage relay and the closing coil of the contactor.

3. In a storage battery charge control, a combination for automatically preheating the filament cathode of a thermionic rectifier connected to the secondary of a transformer only before charging current is permitted to flow, said combination comprising, a supply circuit for the primary of said transformer, a voltage coil and associated means and connections for cutting the transformer primary into and out of the main circuit, a circuit for connecting the voltage coil to the battery, a contactor for closing and opening the charging circuit, a shunt coil and its exciting circuit for closing the contactor, an intermittently operated circuit interrupter for normally including the voltage and shunt coils in their respective circuits and for periodically cutting the voltage and shunt coils out of said circuits to include the transformer primary in circuit and to interrupt the charging circuit thereby heating the filament before charging current flows, and a series coil for the contactor which holds it against the action of the intermittently operated interrupter to avoid the interruption of current when the transformer primary is connected to its supply circuit.

4. In combination in a storage battery charging system, a storage battery, a source of alternating current, a transformer whose primary is normally connected to the source and whose secondary is connected to said battery through a charging circuit containing a thermionic rectifier whose cathode filament is supplied with heating current from a portion of the secondary winding, means responsive to the battery condition for opening the primary circuit, and means independent of the battery condition for simultaneously closing the primary circuit and opening the charging circuit and thereafter closing the charging circuit.

5. In a storage battery charge control, a combination for automatically heating the cathode filament of a thermionic rectifier connected to the secondary of a transformer, said heating occurring before charging current is permitted to flow through said rectifier, said combination comprising, a source of alternating current, a transformer having its primary in a circuit including said source, a first switch connected between the primary of said transformer and said source, voltage-responsive means and its circuit connections for opening said first switch, a thermionic rectifier having a filament cathode connected to a portion of the secondary of said transformer, a contactor controlling the output of charging current from said rectifier, a coil controlling the operation of said contactor, an intermittently operated switch, and connections and means whereby said intermittently operated switch interrupts the circuit of the voltage-responsive means, thereby causing the first switch to be closed to connect said transformer to said source and cause a flow of current through said filament cathode of said rectifier and simultaneously opens the circuit of said coil and whereby said intermittently operated switch subsequently restores the circuit of the voltage-responsive means and closes the circuit of said coil.

FRANK G. BEETEM.